United States Patent
Kim et al.

(10) Patent No.: US 9,766,714 B2
(45) Date of Patent: Sep. 19, 2017

(54) METHOD AND APPARATUS FOR RECOGNIZING KEY INPUT FROM VIRTUAL KEYBOARD

(71) Applicant: POSTECH ACADEMY-INDUSTRY FOUNDATION, Gyeongsangbuk-do (KR)

(72) Inventors: Young Hwan Kim, Gyeongsangbuk-do (KR); Sung In Cho, Seoul (KR); Dong Gon Yoo, Gyeongsangbuk-do (KR); Sang Hun Kim, Jeollanam-do (KR)

(73) Assignee: POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 4 days.

(21) Appl. No.: 14/394,029

(22) PCT Filed: Mar. 5, 2013

(86) PCT No.: PCT/KR2013/001762
§ 371 (c)(1),
(2) Date: Oct. 10, 2014

(87) PCT Pub. No.: WO2013/154268
PCT Pub. Date: Oct. 17, 2013

(65) Prior Publication Data
US 2015/0084869 A1    Mar. 26, 2015

(30) Foreign Application Priority Data
Apr. 13, 2012   (KR) .................. 10-2012-0038351

(51) Int. Cl.
*G06F 3/023*   (2006.01)
*G06F 3/0488*  (2013.01)
*G06F 3/042*   (2006.01)

(52) U.S. Cl.
CPC ............ *G06F 3/023* (2013.01); *G06F 3/0426* (2013.01); *G06F 3/04886* (2013.01)

(58) Field of Classification Search
None
See application file for complete search history.

(56) References Cited

U.S. PATENT DOCUMENTS

| 6,614,422 B1 * | 9/2003 | Rafii ................ G06F 1/1626 345/156 |
| 8,866,745 B1 * | 10/2014 | Schrick ............... G06F 3/023 345/156 |

(Continued)

FOREIGN PATENT DOCUMENTS

| JP | 2003-288156 A | 10/2003 |
| JP | 2007-072637 A | 3/2007 |

(Continued)

OTHER PUBLICATIONS

International Search Report dated Jun. 28, 2013; PCT/KR2013/001762.

*Primary Examiner* — David D Davis
(74) *Attorney, Agent, or Firm* — Ladas & Parry LLP

(57) ABSTRACT

Disclosed are a method and an apparatus for recognizing a key input from a virtual keyboard according to one embodiment of the present invention. The method for recognizing a key input from a virtual keyboard according to one embodiment of the present invention is a method for recognizing a key input from a virtual keyboard using at least one camera, e.g. two cameras or one 3D camera, and includes the steps of: tracking a user tool when the actuation of the user tool for a key input on the virtual keyboard is detected using the camera, and continuing the tracking until the vertical coordinate of the position of the user tool is less than or equal to a predetermined vertical threshold value;

(Continued)

and determining that a key input has been carried out at the last tracked horizontal position of the user tool.

10 Claims, 3 Drawing Sheets

(56) References Cited

U.S. PATENT DOCUMENTS

| | | | | |
|---|---|---|---|---|
| 2002/0060669 A1* | 5/2002 | Sze | ............ | G06F 3/017 345/173 |
| 2005/0024324 A1* | 2/2005 | Tomasi | ............ | G06F 1/1613 345/156 |
| 2006/0244720 A1* | 11/2006 | Tracy | ............ | G06F 3/0426 345/156 |
| 2007/0035521 A1* | 2/2007 | Jui | ............ | G06F 3/0426 345/168 |
| 2007/0115261 A1* | 5/2007 | Cho | ............ | G06F 1/1626 345/168 |
| 2007/0159453 A1* | 7/2007 | Inoue | ............ | G06F 1/1616 345/156 |
| 2009/0153476 A1* | 6/2009 | Kang | ............ | G06F 3/023 345/157 |
| 2009/0217191 A1* | 8/2009 | Shin | ............ | G06F 1/1626 715/773 |
| 2010/0164869 A1 | 7/2010 | Huang et al. | | |
| 2010/0177035 A1* | 7/2010 | Schowengerdt | ............ | G06F 1/163 345/156 |
| 2010/0302165 A1* | 12/2010 | Li | ............ | G06F 3/038 345/168 |
| 2011/0102570 A1* | 5/2011 | Wilf | ............ | G06F 3/017 348/77 |

FOREIGN PATENT DOCUMENTS

| | | |
|---|---|---|
| JP | 2010-067062 A | 3/2010 |
| JP | 2012-053532 A | 3/2012 |
| KR | 1020070009207 A | 1/2007 |
| KR | 1020090100934 A | 9/2009 |

* cited by examiner

METHOD AND APPARATUS FOR RECOGNIZING KEY INPUT FROM VIRTUAL KEYBOARD

TECHNICAL FIELD

The present invention relates to a method and apparatus for recognizing a key input on a virtual keyboard, and more particularly, to a method of recognizing key inputs on various types of virtual keyboards.

BACKGROUND ART

A conventional physical keyboard is bulky and difficult to clean, and therefore there are virtual keyboards obtained by projecting a keyboard on a flat surface, as an alternative. However, users have a hard time adapting to such projected virtual keyboards because they are not user-friendly, and since types and forms are limited, users should adapt to the shape of the keyboard. In addition, these keyboards require expensive hardware resources and an infrared receiver for recognizing a keyboard input of a user in order to form a virtual keyboard.

In addition, in the case of the virtual keyboard applied to a tablet PC, a smartphone, etc., there is a problem that the virtual keyboard covers nearly half of the screen. In addition, when 2-byte characters, special characters, numbers, and the like should be alternately input, keys on the virtual keyboard are also displayed alternately on the screen, and therefore there is a problem that the key input is inconvenient.

DISCLOSURE

Technical Problem

The present invention is directed to providing a method of recognizing a key input which may provide user convenience and be applicable to various kinds of virtual keyboards.

The present invention is directed to providing an apparatus for recognizing a key input which may provide user convenience and be applicable to various kinds of virtual keyboards.

Technical Solution

One aspect of the present invention provides a method of recognizing a key input on a virtual keyboard using at least one camera, including: tracking, when an operation of a user tool for key input on the virtual keyboard using the at least one camera is detected, the user tool until a position on vertical coordinates of the user tool is smaller than or equal to a predetermined vertical threshold value; and determining that a key on a horizontal position of the finally tracked user tool is input.

Here, before the tracking, the method of recognizing the key input may further include: recognizing a position depending on a pattern of each key on the virtual keyboard in accordance with a predetermined pattern recognition method using the camera.

Also, before the tracking, the method of recognizing the key input may further include: measuring the lowest position on the vertical coordinates recognized that the user tool for key input on the virtual keyboard is brought into contact with a flat surface of the virtual keyboard to thereby determine the measured lowest position as the vertical threshold value.

Also, the measuring may include measuring, when the user tool is a hand of the user, vertical coordinates of a fingertip of a user to type the virtual keyboard to thereby determine the lowest point as the vertical threshold value.

Also, the determining may include determining that the key on the horizontal position is input, when at least one predetermined another signal is detected together with the operation of the user tool for key input and a time when the at least one predetermined another signal is generated and a time when the user tool is finally tracked are the same.

Also, the determining may include determining that the key on the horizontal position of the finally tracked user tool is input, when at least one predetermined another signal is detected together with the operation of the user tool for key input and a difference between a time when the at least one predetermined another signal is generated and a time when the user tool is finally tracked is within a predetermined allowable error.

Also, when the difference between the time when the at least one predetermined another signal is generated and the time when the user tool is finally tracked is within the predetermined allowable error, the method of recognizing the key input may further include: correcting the vertical threshold value in accordance with a time when the at least one predetermined another signal is detected.

Also, when it is determined that the key on the horizontal position of the user tool is input in the determining, the method of recognizing the key input may further include: generating a signal for confirming an input of the key.

Also, the signal for confirming the input of the key may include at least one of vibration, sound, and light emission.

Another aspect of the present invention provides an apparatus for recognizing a key input on a virtual keyboard using at least one camera, including: the at least one camera; a user tool tracking unit that tracks, when an operation of a user tool for key input on the virtual keyboard using the at least one camera is detected, the user tool until a position on vertical coordinates of the user tool is smaller than or equal to a predetermined vertical threshold value; and a key value recognition unit that determines that a key on a horizontal position of the user tool finally tracked in the user tool tracking unit is input.

Here, the apparatus for recognizing the key input may further include: a pattern recognition unit that recognizes a position depending on a pattern of each key on the virtual keyboard using a predetermined pattern recognition method.

Also, the apparatus for recognizing the key input may further include: a threshold value initialization unit that determines, as the vertical threshold value, the lowest position on the vertical coordinates recognized that the user tool for key input on the virtual keyboard is brought into contact with a flat surface of the virtual keyboard.

Also, the threshold value initialization unit may measure, when the user tool is a hand of the user, vertical coordinates of a fingertip of a user to type the virtual keyboard to thereby determine the lowest point as the vertical threshold value.

Also, the key value recognition unit may determine that the key on the horizontal position is input, when at least one predetermined another signal is detected together with the operation of the user tool for key input and a time when the at least one predetermined another signal is generated and a time when the user tool is finally tracked are the same.

Also, the key value recognition unit may determine that the key on the horizontal position of the finally tracked user tool is input, when at least one predetermined another signal is detected together with the operation of the user tool for key input and a difference between a time when the at least one predetermined another signal is generated and a time when the user tool is finally tracked is within a predetermined allowable error.

Also, wherein the key value recognition unit may correct the vertical threshold value in accordance with a time when the at least one predetermined another signal is detected, when the difference between the time when the at least one predetermined another signal is generated and the time when the user tool is finally tracked is within the predetermined allowable error.

Also, the key value recognition unit may generate a signal for confirming an input of the key when it is determined that the key on the horizontal position of the user tool is input.

Also, the signal for confirming the input of the key may include at least one of vibration, sound, and light emission.

Advantageous Effects

According to the method and apparatus for recognizing the key input on the virtual keyboard according to the present invention, a pattern of keys displayed on various kinds of virtual keyboards may be recognized using a camera, and movement of a user who types the keys may be tracked to recognize an input key value, and therefore it is possible to recognize a key input of the user regardless of the type and form of the keyboard. In particular, when the method and apparatus for recognizing the key input on the virtual keyboard according to the present invention are applied to a tablet PC or a smartphone, a separate virtual keyboard may be used, and therefore inconveniences such as a screen being hidden by the virtual keyboard displayed on a screen of a conventional PC or smartphone or different types of keys of 2-byte code being alternatively displayed on the screen when inputting the different types of keys of 2-byte code are overcome. In addition, when at least two cameras or a three-dimensional (3D) camera is already attached due to an additional function of the tablet PC or the like such as 3D photography, no additional hardware resources is required.

MODES OF THE INVENTION

Figure 1:
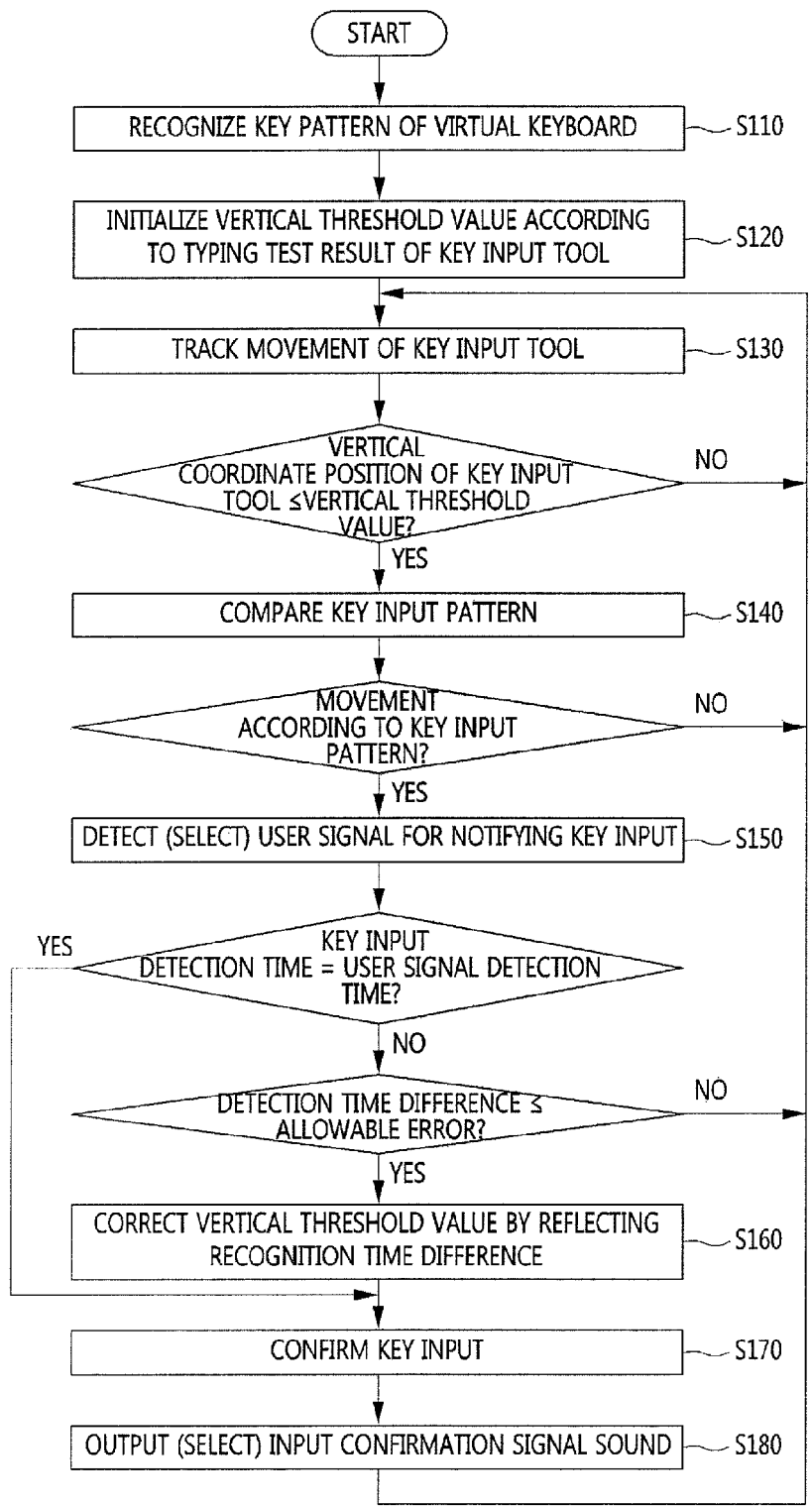
FIG. 1 is a flowchart illustrating a process of recognizing a key input on a virtual keyboard according to an embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. Such terms are used only to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. In order to facilitate a thorough understanding of the present invention, the same reference numerals designate the same components in the drawings, and repeated description of the same components will be omitted.

FIG. 1 is a flowchart illustrating a process of recognizing a key input on a virtual keyboard according to an embodiment of the present invention.

Referring to FIG. 1, the process of recognizing the key input on the virtual keyboard according to an embodiment of the present invention includes a key pattern recognition operation S110, a threshold value initialization operation S120, a key input tool movement tracking operation S130, a key input pattern comparison operation S140, a user signal detection operation S150, a threshold value correction operation S160, a key input confirmation operation S170, and a confirmation signal sound output operation S180.

In addition, referring to FIG. 1, the process of recognizing the key input on the virtual keyboard according to an embodiment of the present invention may be performed using at least one camera, and each operation will be described below.

The key pattern recognition operation S110 may be an operation in which a position depending on a pattern of each key on a virtual keyboard is recognized in accordance with a predetermined pattern recognition method using the at least one camera. Hereinafter, the key pattern recognition method on the virtual keyboard will be described with reference to the drawings. In this instance, two cameras or one three-dimensional (3D) camera may be used as the camera.

Figure 2:
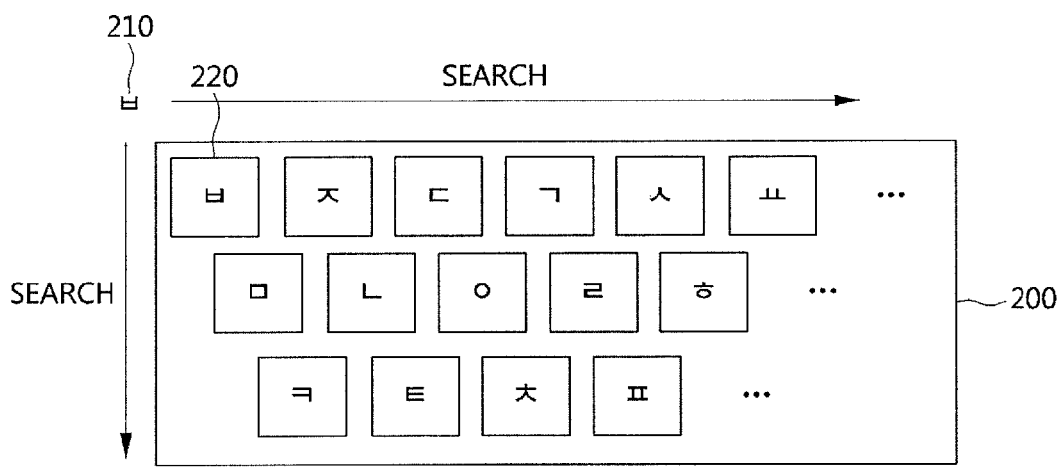
FIG. 2 is a conceptual diagram illustrating an example of recognizing keys on a virtual keyboard according to an embodiment of the present invention.

FIG. 2 is a conceptual diagram illustrating an example of recognizing keys on a virtual keyboard according to an embodiment of the present invention.

Referring to FIG. 2, positions of respective keys within a virtual keyboard 200 according to the present invention may be determined through a method of recognizing a pattern of characters ("ㄱ," "ㄴ," "ㄷ," and the like) using a camera. For example, when searching for "ㅂ" in accordance with the pattern recognition method, the surrounding closed region may be considered as a region of "ㅂ" after searching for "ㅂ" 210.

Meanwhile, a key input on the virtual keyboard according to the present invention is recognized using an image tracking method, and therefore a projection keyboard may be created to be used using a laser in the same manner as in a conventional projection keyboard, a keyboard may be directly drawn by a user to be used, or a conventional physical keyboard may be used. In addition, there is no a physical boundary, and therefore the sizes and positions of the keys may be arbitrarily changed. For example, the "Esc" key may be made larger than the conventional key or "Enter" keys may be disposed on both sides. Thus, although the keyboard is made using a laser in the same manner as in the existing projection keyboard, positions of laser hardware that creates the keyboard and camera hardware that recognizes the laser hardware may be determined independently from each other, which is advantageous to designability.

In addition, a range of a specific key may be changed in accordance with a user input pattern. When a hand is placed on a flat surface with no intention to perform key input, data with respect to a specific user is accumulated in addition to overall habits of users and distinguished, thereby contributing to user convenience.

The threshold value initialization operation S120 may be an operation of measuring the lowest position of vertical coordinates at which it is recognized that a user tool for key input on a virtual keyboard is brought into contact with a flat surface of the virtual keyboard, and determining the measured lowest position as a vertical threshold value. For example, when the user tool is a user's hand and the key on the virtual keyboard is touched, vertical coordinates of the finger recognized by a camera may be different according to thicknesses of the user's fingers, or the like.

Thus, when a finger tip of the user is located at the lowest position while the user initially types arbitrary keys several times, the lowest point on the vertical coordinates from the virtual keyboard may be set as the vertical threshold value. In the future, when the finger tip is located at a position lower than the set vertical threshold value, it may be determined that input is performed on the key of the corresponding position. In this instance, in order to recognize the input using the camera, the position of the finger tip should be first determined, and an existing position finding method based on a color of a hand, an existing method of positioning a hand in a predetermined region by a user, or the like which has been developed may be used.

In the key input tool movement tracking operation S130, when an operation of the user tool for key input on the virtual keyboard is detected using the camera, the user tool may be tracked. In this instance, the user tool may be tracked until a position of the user tool on the vertical coordinates is smaller than or equal to a predetermined vertical threshold value, for example, a vertical threshold value set in the threshold value initialization operation S120.

The key input pattern comparison operation S140 may be an operation of comparing a key input pattern defined in advance and a key input image tracked in the key input tool movement tracking operation S130 by analyzing a user's typing habit, and distinguishing whether key input is being performed. This is to distinguish a case in which a user positions his or her hands on a flat surface with no intention to perform key input.

For example, the user may take comfortable position in a standby state while not performing typing, and there may be a case in which typing is no longer performed. As easiest simple example, there are a method of recognizing a case in which eight fingers, excluding the thumbs, simultaneously touch as a standby state, a method of creating a key or the like for entering the standby state, etc.

The user signal detection operation S150 may be an operation of detecting at least one predetermined other signal together with an operation of the user tool for key input, that is, a user signal caused by the user in accordance with selection. In this instance, when a difference between a time at which the user signal is detected and a time at which the user tool is finally tracked are compared and the compared difference is within a predetermined allowable error, the vertical threshold value may be corrected in accordance with the time at which the user signal is detected in operation S160.

That is, in order to increase accuracy of tracking image recognition with respect to the user tool (for example, user's hand) that inputs a key on the virtual keyboard, signals from the user such as sound and vibration are detected, and a method of correcting the vertical threshold value may be used in order to synchronize a time difference depending on the image recognition result and the detection result of the user signal. Hereinafter, descriptions will be made with reference to the drawings.

Figure 3:
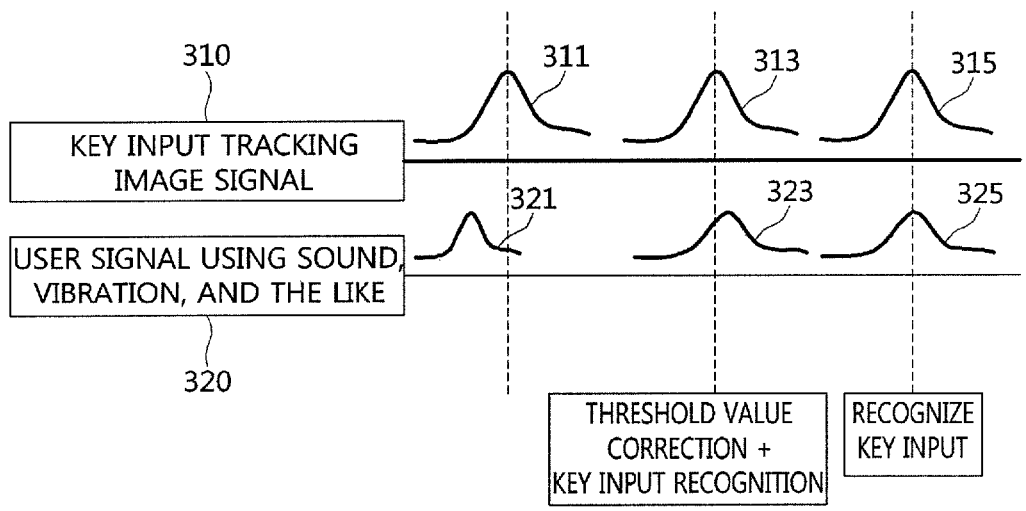
FIG. 3 is a conceptual diagram illustrating a processing process in accordance with a key input and a detection time difference of user signals according to an embodiment of the present invention.

FIG. 3 is a conceptual diagram illustrating a processing process in accordance with a key input and a detection time difference of user signals according to an embodiment of the present invention.

Referring to FIG. 3, three different signals input as a tracking image signal 310 and a user signal 320 are shown. The first case is a case in which the key is not determined to be input due to a significant detection time difference between the image signal 311 and the user signal 321. The second case is a case in which the key is determined to be input because the detection time difference between the image signal 313 and the user signal 323 is an allowable difference. In addition, in this case, the threshold value may be corrected in accordance with the user signal detection time in order to adjust an arrival time difference between the signals in operation S150. The third case is a case in which the key is determined to be input because there is no difference between the image signal 315 and the user signal 315. In addition, in this case, correction of the threshold value is not required to be performed.

The key input confirmation operation S170 may be an operation of determining that a key on the horizontal position of the user tool finally tracked is input. That is, a position on horizontal coordinates of a position in which the position on the vertical coordinates of the finally tracked user tool is smaller than a predetermined vertical threshold value may be derived, and it may be determined that a key value corresponding to the derived position is input. In this instance, the key value corresponding to the derived position may be determined referring to the position of the key of in accordance with the pattern recognized in the key pattern recognition operation S110.

Alternatively, when the user signal promised in the user signal detection operation S150 is detected, when a difference between the time when the user signal is detected and the time when the user tool is finally tracked is compared and the compared difference is within a predetermined allowable error, it may be determined that the key value of the position on the corresponding horizontal coordinates is input.

The confirmation signal sound output operation S180 may be an operation of generating a signal for confirming an input of a key when the key on the horizontal position of the user tool is determined to be input in the key input confirmation operation S170. That is, feedback signals such as vibration, light emission, signal sound, and the like may be given so that a user may confirm that the key is normally input. Such feedback signals may reproduce the sensation felt by a user while the user types keys on the conventional keyboard.

Figure 4:
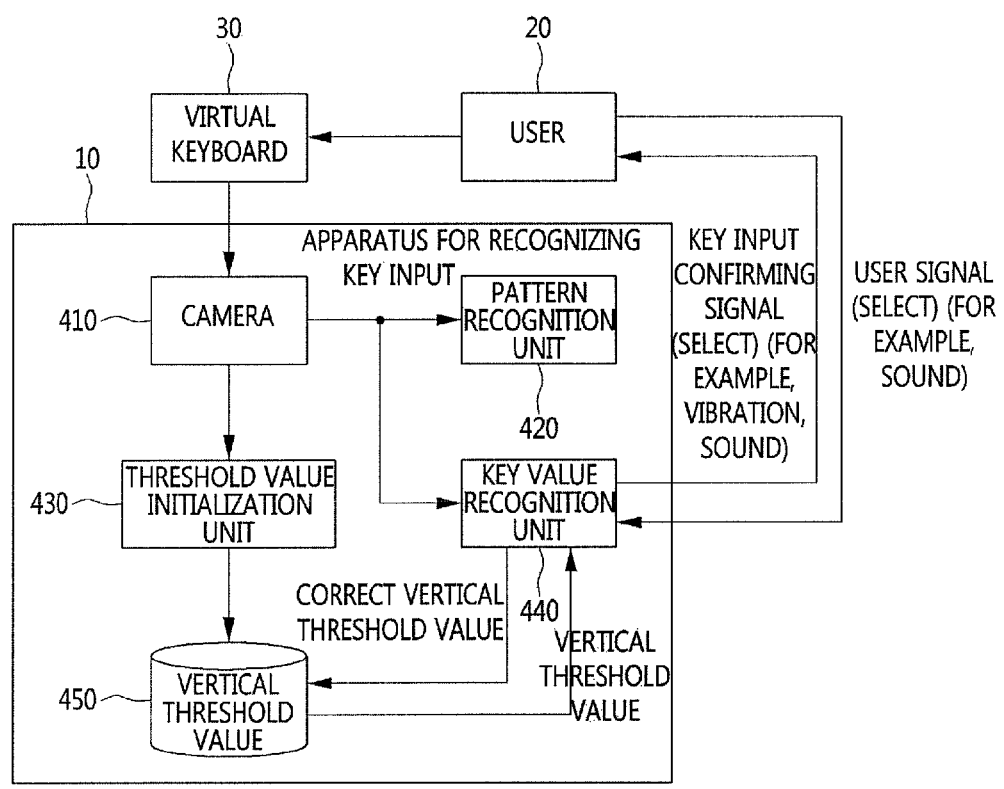
FIG. 4 is a block diagram illustrating a configuration of an apparatus for recognizing a key input on a virtual keyboard according to an embodiment of the present invention.

FIG. 4 is a block diagram illustrating a configuration of an apparatus for recognizing a key input on a virtual keyboard according to an embodiment of the present invention.

Referring to FIG. 4, an apparatus 10 for recognizing a key input on a virtual keyboard 30 according to an embodiment of the present invention may include a camera 410, a pattern recognition unit 420, a threshold value initialization unit 430, and a key value recognition unit 440.

In addition, referring to FIG. 4, each component of the apparatus 10 for recognizing the key input on the virtual keyboard according to an embodiment of the present invention and connection relationship between the components will be described as below.

The camera 410 may be used to confirm a position of each key by recognizing a key pattern on the virtual keyboard 30 and recognize a position of a key input by tracking a key input operation of a user. In this instance, as the camera 410, a dual camera to recognize a user's input may be used.

The pattern recognition unit 420 may recognize a position according to a pattern of each key on the virtual keyboard 30 in accordance with a predetermined pattern recognition method using at least one camera 410 (for example, two cameras or one 3D camera).

The threshold value initialization unit may measure the lowest position on the vertical coordinates recognized that the user tool for key input on the virtual keyboard 30 is brought into contact with the flat surface of the virtual keyboard to thereby determine the measured lowest position as the vertical threshold value.

The key value recognition unit 440 may track the user tool when an operation of the user tool for key input on the virtual keyboard 30 is detected using the camera 410. In this instance, the key value recognition unit 440 may track the user tool until the position on the vertical coordinates of the user tool is smaller than or equal to a predetermined vertical threshold value.

In addition, the key value recognition unit 440 may detect at least one predetermined another signal, that is, a user signal caused by the user together with the operation of the user tool for key input in accordance with selection. In this instance, a difference between a time when the user signal is detected and a time when the user tool is finally tracked is compared, and when the time when the user signal is detected and the time when the user tool is finally tracked are the same, it may be determined that the key on the horizontal position of the finally tracked user tool is input. That is, when a user types a position in which "1" is displayed, by associating the corresponding position value with a pattern recognized in advance, it may be determined that "1" is input, and perform the corresponding process.

However, when the difference is outside a predetermined allowable error range, it may be determined that the key is not input while ignoring the corresponding operation, and when the difference is within the allowable error range, the vertical threshold value is corrected in accordance with the time when the user signal is detected, and it is determined that the key of the corresponding horizontal position is input.

In this instance, a sensor for detecting the user signal may be used, and an ADC may be used in order to convert and measure analog signals into digital signals. In addition, in order to measure a difference between the image signal and the user signal, a method of using a difference of the highest points of two signals on a time axis, a method of measuring an interval in which two signals are generated by performing sampling at regular intervals, a method of using a phase measuring instrument.

In addition, the key value recognition unit 440 may generate a signal for confirming an input of a key when it is determined that the key on the horizontal position of the user tool is input. That is, feedback signals such as vibration, light emission, signal sound, and the like may be given so that a user may confirm that the key is normally input.

In this specification, exemplary embodiments of the present invention have been classified as the first, second and third exemplary embodiments and described for conciseness. However, respective steps or functions of an exemplary embodiment may be combined with those of another exemplary embodiment to implement still another exemplary embodiment of the present invention.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of recognizing a key input on a virtual keyboard using at least one camera, comprising:
   measuring the lowest position on vertical coordinates recognized that a user tool for key input on the virtual keyboard is brought into contact with a flat surface of the virtual keyboard to thereby determine the measured lowest position as a predetermined vertical threshold value;
   recognizing a position depending on a pattern of each key on the virtual keyboard in accordance with a predetermined pattern recognition method using the camera;
   tracking, when an operation of the user tool for key input on the virtual keyboard using the at least one camera is detected, the user tool until a position on the vertical coordinates of the user tool is smaller than or equal to the vertical threshold value;

determining that the key on the horizontal position of the finally tracked user tool is input, when at least one predetermined another signal is detected together with the operation of the user tool for key input and a difference between a time when the at least one predetermined another signal is generated and a time when the user tool is finally tracked is within a predetermined allowable error; and correcting the vertical threshold value in accordance with a time when the at least one predetermined another signal is detected in a case that the difference is within a predetermined allowable error.

2. The method of claim 1, wherein the measuring includes measuring, when the user tool is a hand of the user, vertical coordinates of a fingertip of a user to type the virtual keyboard to thereby determine the lowest point as the vertical threshold value.

3. The method of claim 1, wherein the determining includes determining that the key on the horizontal position is input, when at least one predetermined another signal is detected together with the operation of the user tool for key input and a time when the at least one predetermined another signal is generated and a time when the user tool is finally tracked are the same.

4. The method of claim 1, when it is determined that the key on the horizontal position of the user tool is input in the determining, further comprising:

generating a signal for confirming an input of the key.

5. The method of claim 4, wherein the signal for confirming the input of the key includes at least one of vibration, sound, and light emission.

6. An apparatus for recognizing a key input on a virtual keyboard using at least one camera, comprising:

the at least one camera;

a pattern recognition unit that recognizes a position depending on a pattern of each key on the virtual keyboard using a predetermined pattern recognition method;

a threshold value initialization unit that determines, as a predetermined vertical threshold value, the lowest position on vertical coordinates recognized that a user tool for key input on the virtual keyboard is brought into contact with a flat surface of the virtual keyboard;

a user tool tracking unit that tracks, when an operation of the user tool for key input on the virtual keyboard using the at least one camera is detected, the user tool until a position on the vertical coordinates of the user tool is smaller than or equal to the vertical threshold value; and a key value recognition unit that determines that a key on a horizontal position of the user tool finally tracked in the user tool tracking unit is input, wherein the key value recognition unit determines that the key on the horizontal position of the finally tracked user tool is input, when at least one predetermined another signal is detected together with the operation of the user tool for key input and a difference between a time when the at least one predetermined another signal is generated and a time when the user tool is finally tracked is within a predetermined allowable error, and corrects the vertical threshold value in accordance with a time when the at least one predetermined another signal is detected in a case that the difference is within a predetermined allowable error.

7. The apparatus of claim 6, wherein the threshold value initialization unit measures, when the user tool is a hand of the user, vertical coordinates of a fingertip of a user to type the virtual keyboard to thereby determine the lowest point as the vertical threshold value.

8. The apparatus of claim 6, wherein the key value recognition unit determines that the key on the horizontal position is input, when at least one predetermined another signal is detected together with the operation of the user tool for key input and a time when the at least one predetermined another signal is generated and a time when the user tool is finally tracked are the same.

9. The apparatus of claim 6, wherein the key value recognition unit generates a signal for confirming an input of the key when it is determined that the key on the horizontal position of the user tool is input.

10. The apparatus of claim 9, wherein the signal for confirming the input of the key includes at least one of vibration, sound, and light emission.

* * * * *